United States Patent
Naeg et al.

(10) Patent No.: US 8,596,710 B2
(45) Date of Patent: Dec. 3, 2013

(54) SLIDING DOOR SYSTEM

(75) Inventors: Dorinel Naeg, Walled Lake, MI (US); Dennis G. Willyard, Macomb, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 9 days.

(21) Appl. No.: 13/369,545

(22) Filed: Feb. 9, 2012

(65) Prior Publication Data

US 2013/0205668 A1    Aug. 15, 2013

(51) Int. Cl.
*B60J 5/06*    (2006.01)

(52) U.S. Cl.
USPC ................... 296/155; 296/146.4; 49/217

(58) Field of Classification Search
USPC ............ 296/155, 146.4, 146.12; 49/213, 216, 49/217, 218
See application file for complete search history.

(56) References Cited

U.S. PATENT DOCUMENTS

| | | | |
|---|---|---|---|
| 5,896,704 A | 4/1999 | Neag et al. | |
| 6,183,039 B1* | 2/2001 | Kohut et al. | 296/155 |
| 6,286,261 B1 | 9/2001 | Hackstock | |
| 6,840,567 B2 | 1/2005 | Fushimi et al. | |
| 6,932,417 B2 | 8/2005 | Barczynski et al. | |
| 7,243,978 B2 | 7/2007 | Mather et al. | |
| 7,658,438 B1* | 2/2010 | Elliott et al. | 296/155 |
| 7,765,740 B2* | 8/2010 | Heuel et al. | 49/360 |
| 7,896,425 B2* | 3/2011 | Elliott et al. | 296/146.12 |
| 7,954,880 B2* | 6/2011 | Kunishima et al. | 296/155 |
| 8,152,221 B2* | 4/2012 | Yoshioka | 296/155 |
| 2009/0230721 A1 | 9/2009 | Rusnak | |

FOREIGN PATENT DOCUMENTS

| | | |
|---|---|---|
| DE | 10326241 A1 | 1/2005 |
| FR | 2910385 A1 | 6/2008 |

OTHER PUBLICATIONS

International Search Report dated Apr. 5, 2013 for International Application No. PCT/US2013/025062, International Filing Date Feb. 7, 2013.
Written Opinion dated Apr. 5, 2013 for International Application No. PCT/US2013/025062, International Filing Date Feb. 7, 2013.

* cited by examiner

*Primary Examiner* — Jason S Morrow
(74) *Attorney, Agent, or Firm* — Frederick A. Krieger

(57) ABSTRACT

A system may include a door track, a guide mechanism, and a sequencing mechanism. The door track is mounted to a door. The guide mechanism connects the door to a vehicle body. The guide mechanism may include a first member connected to the door track and a second member connected to the first member for rotation relative to the door track. The first member is movable relative to the door track. The second member may engage a body track in the vehicle body and may be movable relative thereto between a first and second ends of the body track. The sequencing mechanism may include a third member locking the first member relative to the door track when the door is between the intermediate and closed positions and a fourth member locking the second member relative to the body track when the door is between the intermediate and fully open positions.

18 Claims, 9 Drawing Sheets

SLIDING DOOR SYSTEM

FIELD

The present disclosure relates to a sliding door system for a vehicle.

BACKGROUND

Some vehicles such as vans and minivans, for example, may include one or more sliding door assemblies. Conventional sliding door assemblies typically include a door slidably supported relative to a vehicle by three discrete tracks. For example, the vehicle may incorporate a first track located proximate to a floor panel of the vehicle, a second track located proximate to a roof panel of the vehicle, and a third track located between the first track and the second track and proximate to a C-pillar of the vehicle. The first track, second track, and third track cooperate to support the door relative to the vehicle and to control movement of the door between a closed position and an open position. Specifically, each of the first, second, and third tracks may receive first, second, and third guide members associated with the door that permit the door to move relative to the vehicle. Further, the first track, the second track, and the third track each cooperate to support the overall weight of the sliding door and maintain the stability of the door throughout the range-of-motion of the door when moving between the closed state and the open state.

While conventional sliding door assemblies adequately guide and support sliding doors relative to a vehicle, sliding-side doors conventionally have only been incorporated into vehicles having a substantially flat or uniform side panel that can efficiently accommodate the length of the middle track and can permit clearance of the sliding-side door when moving from the closed state to the open state. As such, sliding doors have conventionally been reserved for vans and minivans that have a substantially flat, elongated side panel and were not incorporated into vehicles having a somewhat short and uneven side panel such as a sedan, sport-utility vehicle, or truck, as such vehicles may not have been able to properly accommodate the length of a conventional middle track.

SUMMARY

In one form, the present disclosure provides a system for moving of a door of a vehicle. The system may include a door track, a guide mechanism, and a sequencing mechanism. The door track may be mounted to the door. The guide mechanism may connect the door to a vehicle body for relative motion therebetween. The guide mechanism may include a first member connected to the door track and a second member pivotably connected to the first member for rotation relative to the door track. The first member may be movable relative to the door track and the door. The second member may engage a body track formed in the vehicle body and may be movable relative thereto between a first end of the body track and a second end of the body track. The sequencing mechanism may include first and second links. The first link may be movable between a locked position restricting movement of the first member relative to the door track and an unlocked position allowing movement of the first member relative to the door track. The second link may be movable between a locked position restricting movement of the second member relative to the body track and an unlocked position allowing movement of the second member relative to the body track. The first and second links may be configured to be operably connected with each other such that movement of the second link into the locked position causes corresponding movement of the first link into the unlocked position.

In some embodiments, movement of the first link into the locked position causes corresponding movement of the second link into the unlocked position. The second link may move to the locked position upon movement of the second member to the second end of the body track, thereby moving the second link to the unlocked position and allowing movement of the door track and the door relative to the first member.

In some embodiments, the first and second links are operably connected with each other when the second member is between the first and second ends of the body track and are disconnected from each other when the second member is at the first end of the body track.

In some embodiments, the first member includes a seal member that sealingly engages the vehicle body to substantially seal the door to a doorway in the vehicle body. The sequencing mechanism may include a third link movable between a connected position in which the third link operably interconnects the first and second links and a disconnected position in which the first and second links are operably disconnected from each other. The third link may be in the disconnected position when the second member of the guide mechanism is at the first end of the body track. In some embodiments, rotation of the second member relative to the first member may cause the third link to move into the connected position. The third link may be disposed entirely on a first side of the seal member when the second member is at the first end of the body track and may extend laterally across the seal member in the connected position.

In some embodiments, the seal member may sealingly engage a body seal member that at least partially surrounds the doorway in the vehicle body.

In some embodiments, the first member and the first link may be at least partially concealed by a movable cover when the second member is at the first end of the body track.

In some embodiments, the vehicle body may include an upper track and a lower track, and the door may include an upper track guide movably engaging the upper track and a lower track guide movably engaging the lower track. The body track may be disposed between the upper and lower tracks.

In another form, the present disclosure provides a vehicle that may include a vehicle body, a door, a guide mechanism, a sequencing mechanism, and a seal member. The vehicle body may define a doorway. The door may include a door track and may be movable relative to the doorway among a closed position, an intermediate position, and a fully open position. The guide mechanism may connect the door to a vehicle body for relative motion therebetween. The guide mechanism may include a first member connected to the door track and a second member pivotably connected to the first member for rotation relative to the door track. The first member may be movable relative to the door track and the door. The second member may engage a body track formed in the vehicle body and may be movable relative thereto between a first end of the body track and a second end of the body track. The sequencing mechanism may include a third member locking the first member relative to the door track when the door is between the intermediate position and the closed position and a fourth member locking the second member relative to the body track when the door is between the intermediate position and the fully open position. The seal member may be disposed on the first member and may sealingly engage the vehicle body to substantially seal the door to the doorway when the door is in the closed position.

In some embodiments, the sequencing mechanism may include a fifth member movable between a connected position in which the fifth member operably interconnects the third and fourth members and a disconnected position in which the third and fourth members are operably disconnected from each other. The fifth member may be in the disconnected position when the door is in the closed position.

In some embodiments, the seal member may sealingly engage a body seal member when the door is in the closed position. The body seal member may be mounted to the vehicle body and may at least partially surround the doorway in the vehicle body. The fifth member may be disposed entirely on a first side of the body seal member when the door is in the closed position and may extend laterally across the body seal member in the connected position. The fifth member may be in the connected position when the door is in one of the intermediate position and the fully open position.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
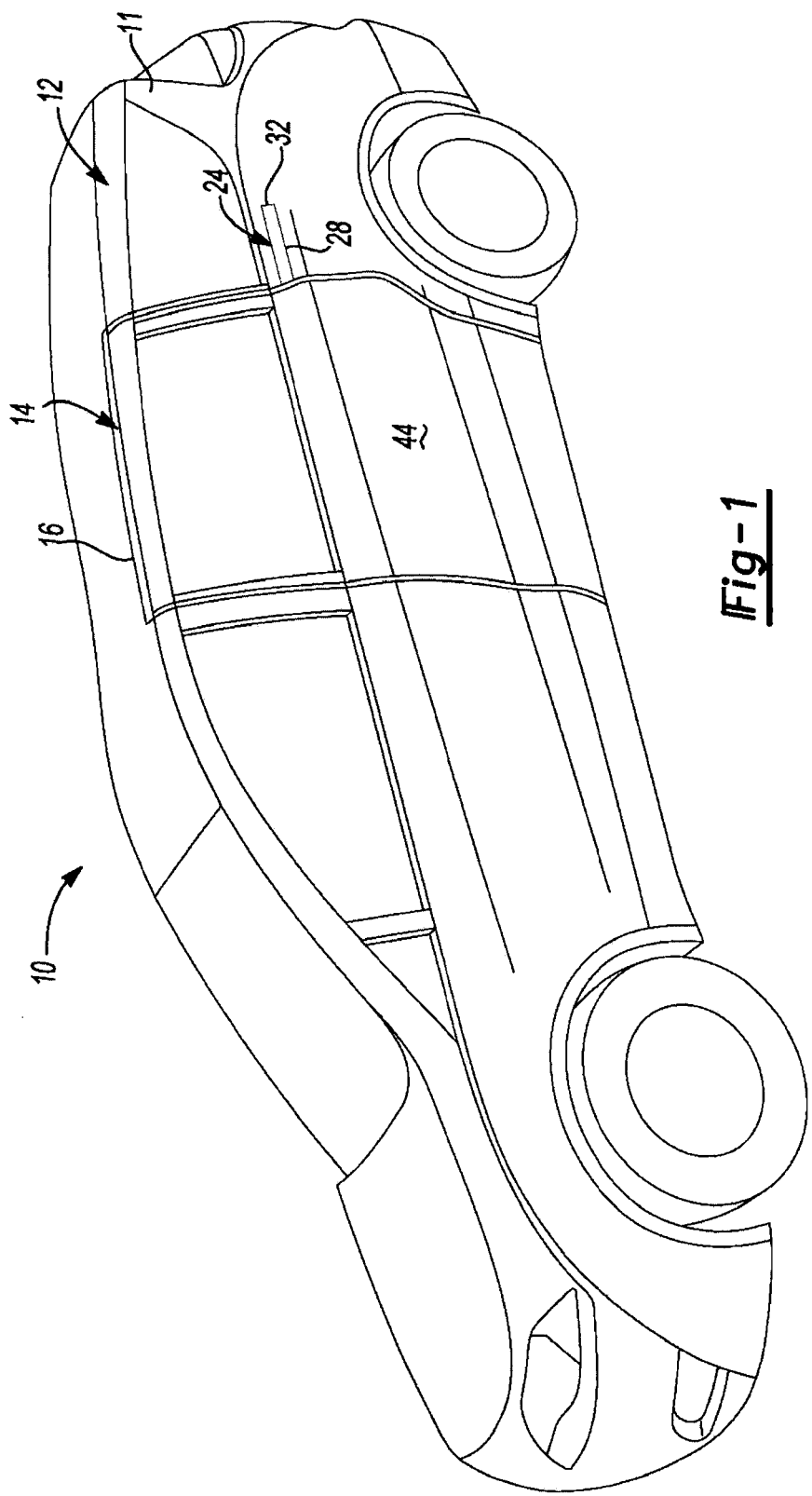
FIG. 1 is a partial perspective view of a vehicle including a door in a closed position according to the principles of the present disclosure.
Figure 2:
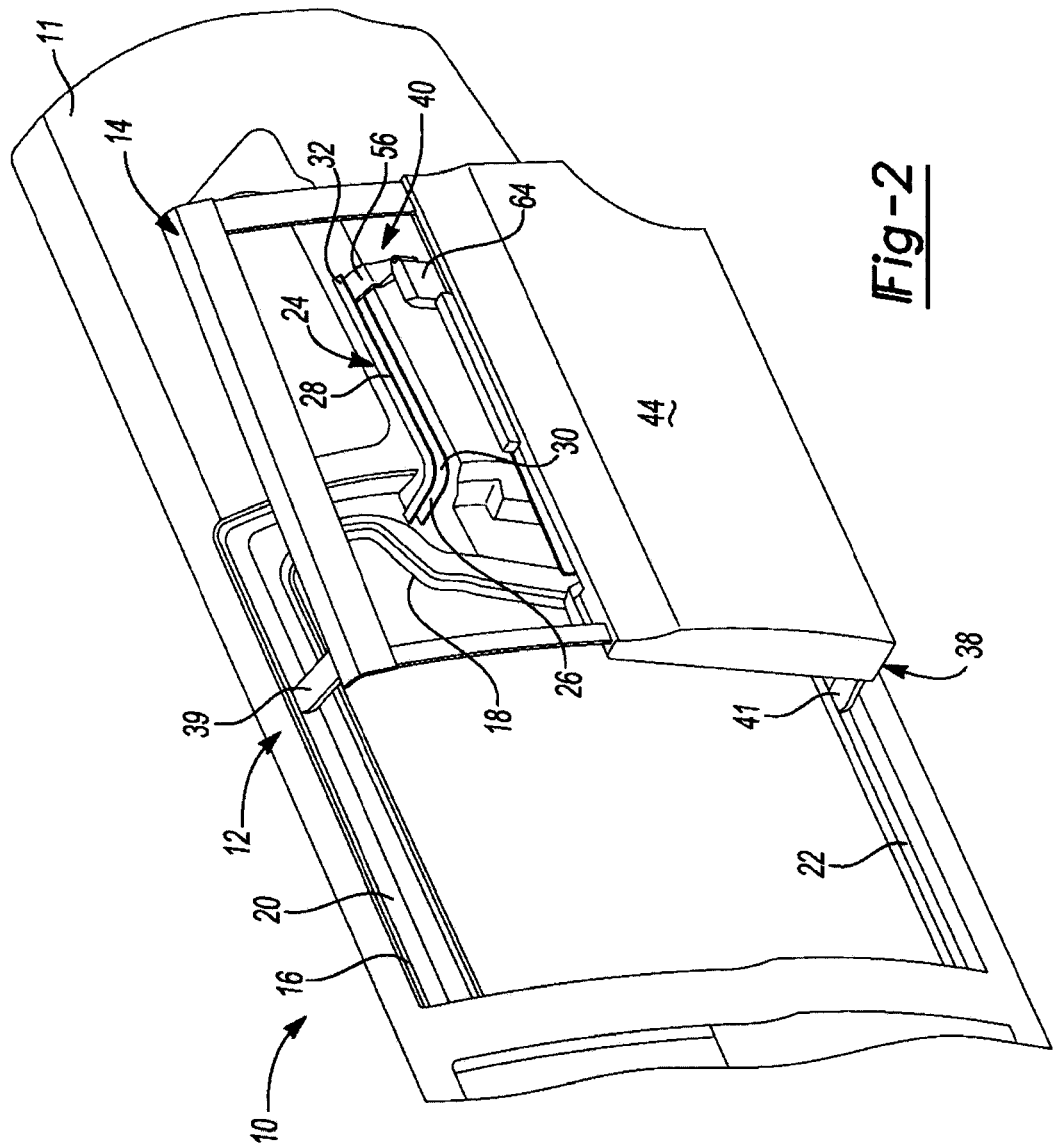
FIG. 2 is a partial perspective view of the vehicle of FIG. 1 with the door in an intermediate position according to the principles of the present disclosure.
Figure 3:
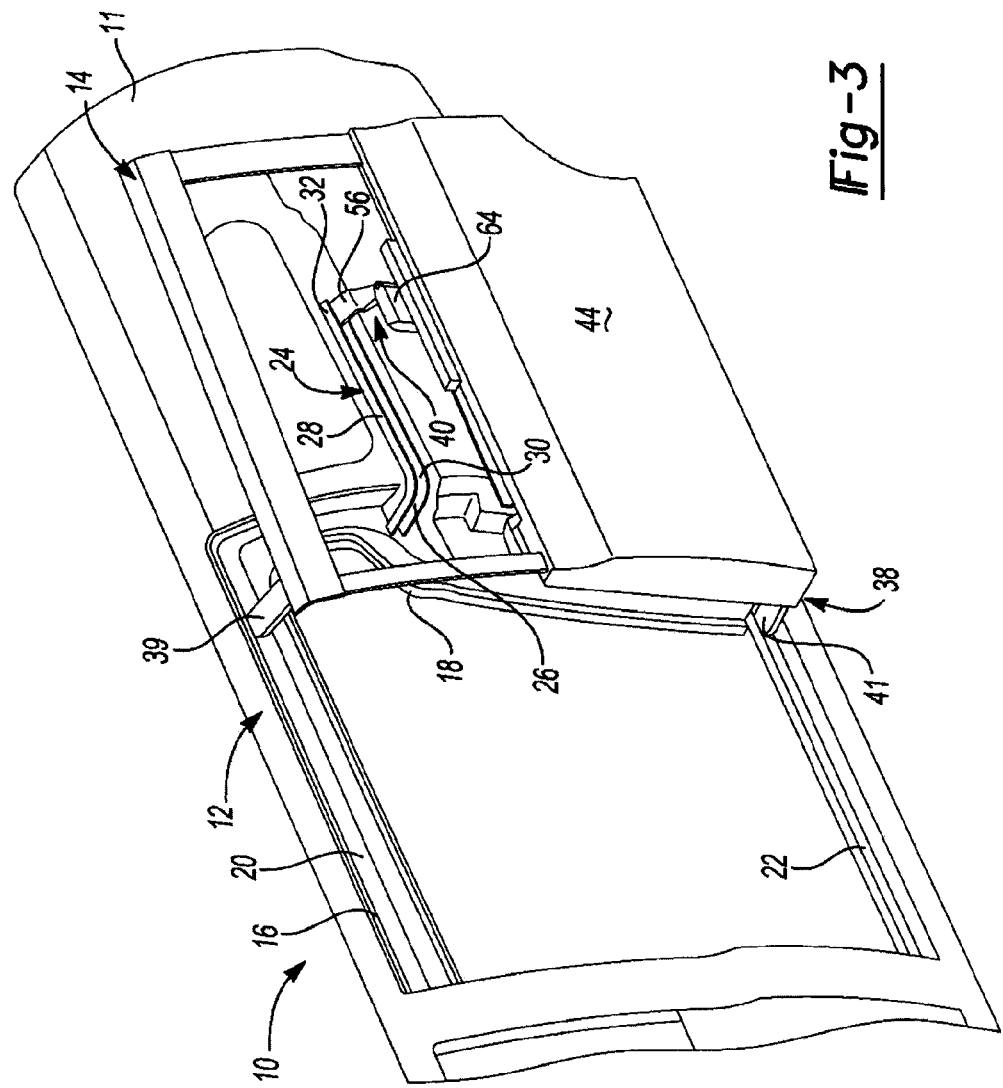
FIG. 3 is a partial perspective view of the vehicle of FIG. 1 with the door in a fully open position according to the principles of the present disclosure.

In an exemplary embodiment and with reference to FIGS. 1-16, a vehicle 10 is provided that may include a vehicle body 12 and a door 14. As shown in FIGS. 2 and 3, the vehicle body 12 may include a doorway 16 having a seal member 18 extending around a periphery of the doorway 16. The vehicle body 12 may also include an upper track 20, a lower track 22, and an exterior body track 24. As will be subsequently described, the door 14 may be moveable relative to the doorway 16 among a closed position (FIG. 1), an intermediate position (FIG. 2), and a fully opened position (FIG. 3). While the vehicle 10 is depicted in FIG. 1 as a minivan, it will be appreciated that the vehicle 10 could be a car, a truck, a sport-utility-vehicle, a crossover vehicle, or a full-size van, for example, or any other type of vehicle.

Figures 15, 16:
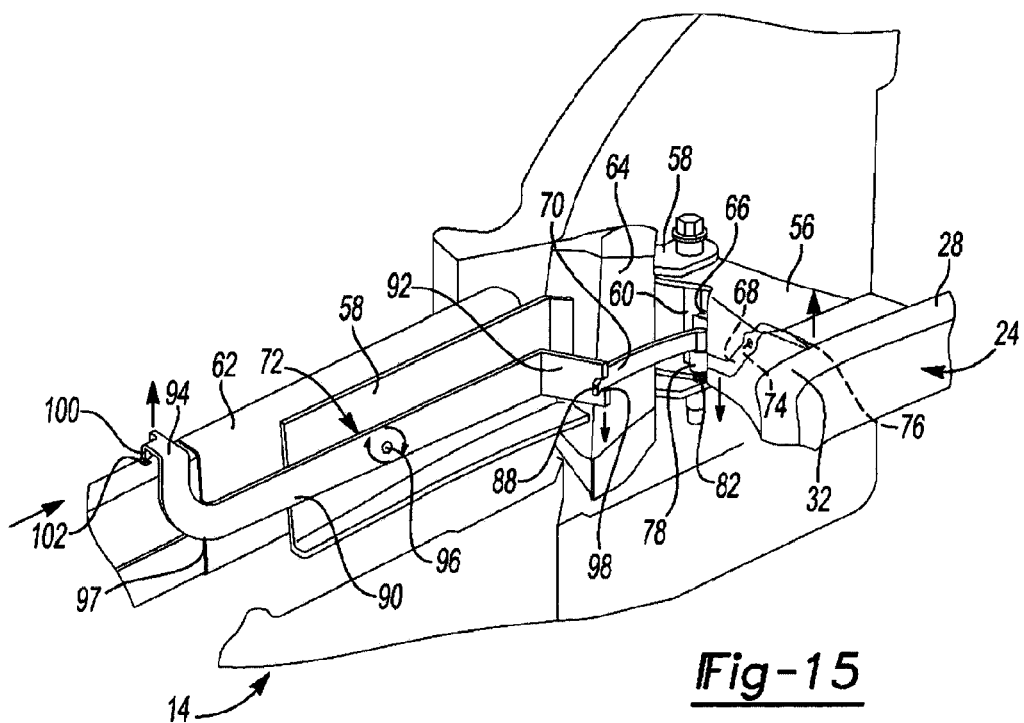
FIG. 15 is a partial perspective view of the guide mechanism and the sequencing mechanism while the door is in the intermediate position.
FIG. 16 is a partial perspective view of the sequencing mechanism and a body track according to the principles of the present disclosure.

As shown in FIGS. 1-6, the exterior body track 24 may extend from the doorway 16 toward an aft end 11 of the vehicle 10 and may include a first portion 26, a second portion 28, and an elbow portion 30. The first portion 26 may be disposed adjacent to the doorway 16 and may extend in a direction substantially perpendicular to the second portion 28. The second portion 28 may extend from the elbow portion 30 toward the aft end 11 and may include a distal end 32. As shown in FIG. 16, the distal end 32 may include a ramp 34 and a block 36.

Figure 4:
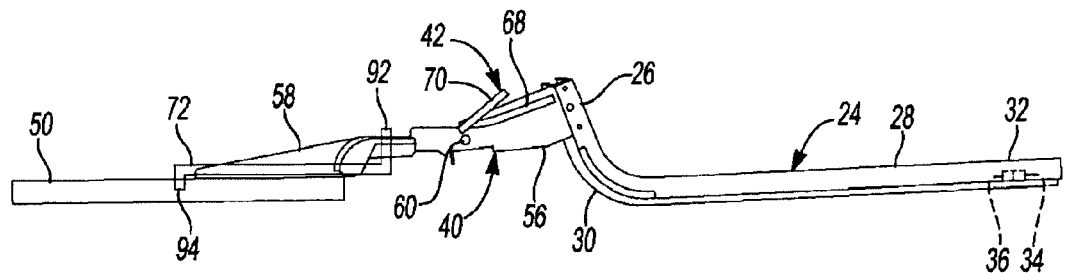
FIG. 4 is a schematic representation of a guide mechanism and sequencing mechanism of the door when the door is in the closed position.
Figure 5:
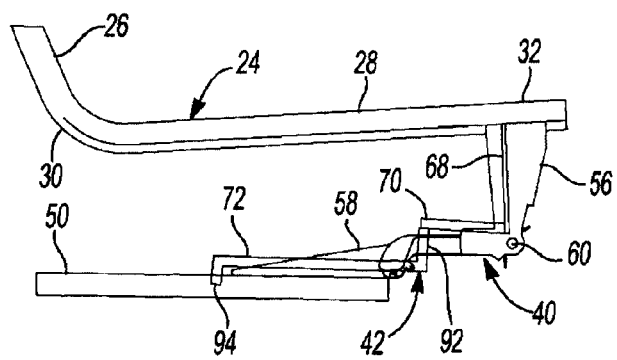
FIG. 5 is a schematic representation of the guide mechanism and sequencing mechanism when the door is in the intermediate position.
Figure 6:
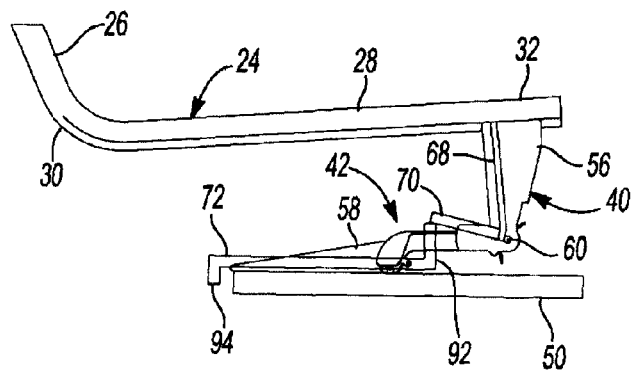
FIG. 6 is a schematic representation of the guide mechanism and sequencing mechanism when the door is in the fully open position.
Figure 7:
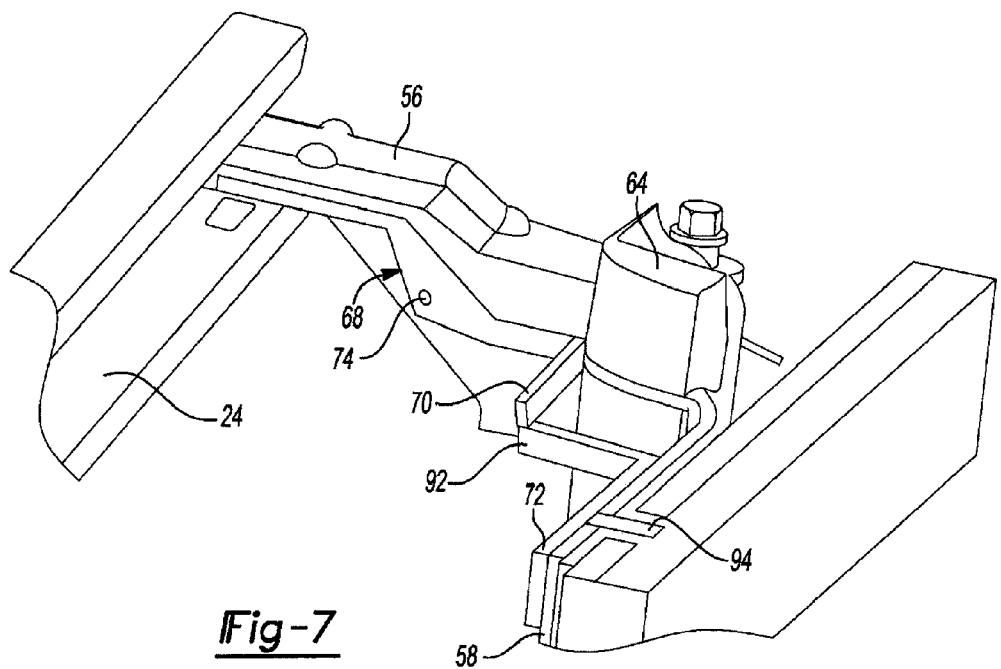
FIG. 7 is another schematic representation of the guide mechanism and sequencing mechanism.
Figure 8:
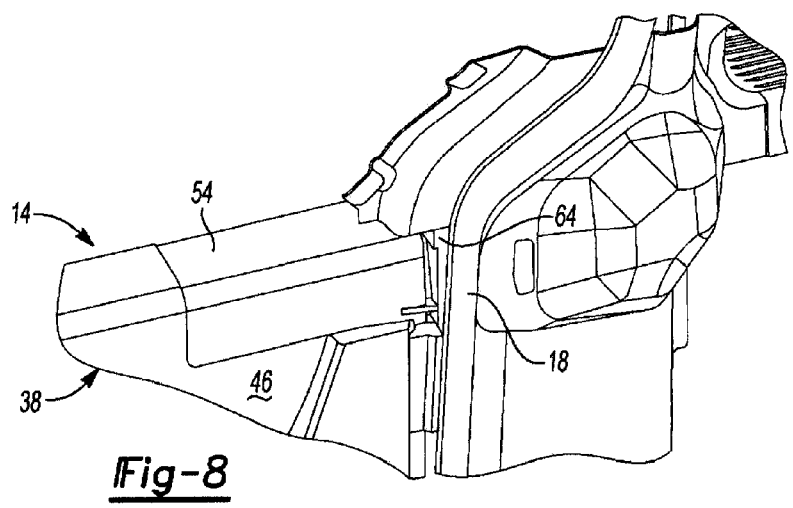
FIG. 8 is a partial perspective view of an interior side of the door in the closed position according to the principles of the present disclosure.
Figure 9:
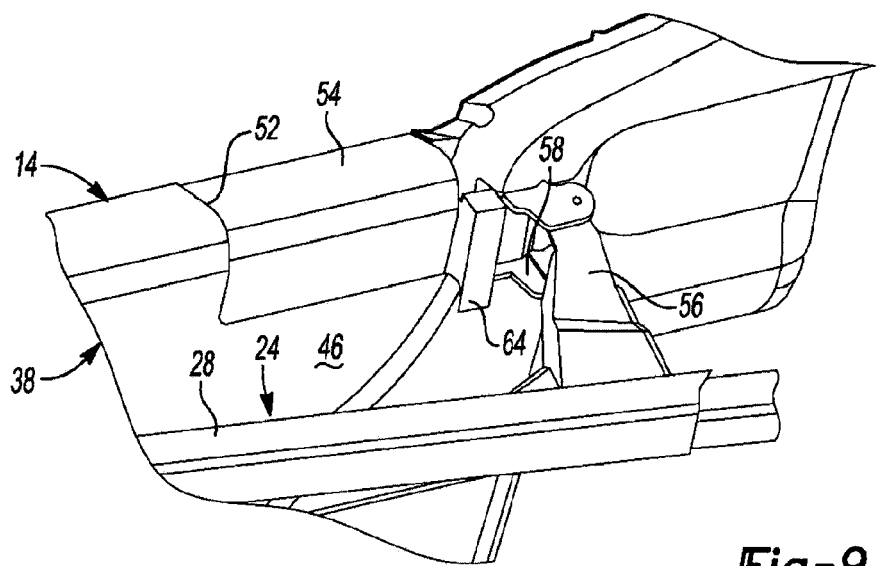
FIG. 9 is a partial perspective view of the interior side of the door in the intermediate position according to the principles of the present disclosure.

The door 14 may include a body shell 38, an upper guide 39, a guide mechanism 40, a lower guide 41, and a sequencing mechanism 42 (FIGS. 4-6). The body shell 38 may include an outer panel 44 (FIGS. 1-3) and an inner panel 46 (FIGS. 12-13) cooperating to define a cavity 48. A door track 50 (FIGS. 12-13) may be disposed within the cavity 48 and may be fixed relative to the outer and inner panels 44, 46. The sequencing mechanism 42 may engage the door track 50 and may extend out of the cavity 48 through an opening 52. A retractable cover 54 (FIGS. 8-10) may selectively open and close the opening 52. The retractable cover 54 moves from a closed position (FIG. 8) to an open position (FIG. 10) as the door 14 is moved from the intermediate position to the fully open position.

As shown in FIGS. 2 and 3, the upper guide 39 movably engages the upper track 20 in the vehicle body 12, the lower guide 41 movably engages the lower track 22, and the guide mechanism 40 movably engages the exterior body track 24. In this manner the upper guide 39, lower guide 41, and guide mechanism 40 support the door 14 and facilitate movement of the door 14 relative to the doorway 16.

Referring now to FIGS. 4-6 and 12-16, the guide mechanism 40 may include a first member 56, a second member 58, and a hinge pin 60. The first member 56 may moveably engage the exterior body track 24 and may be rotatable relative to the second member 58 about the hinge pin 60 between a first position corresponding to the closed position of the door 14 (e.g., FIG. 4) and a second position corresponding to the intermediate and fully open positions of the door 14 (e.g., FIGS. 5 and 6). The hinge pin 60 may include a cam 66 extending radially outward therefrom. The second member 58 may include a sleeve 62 and a seal member 64 disposed between the sleeve 62 and the hinge pin 60. The sleeve 62 may slidably engage the door track 50 between a first position corresponding to the closed and intermediate positions of the door 14 and a second position corresponding to the fully open position of the door 14.

Figure 11:
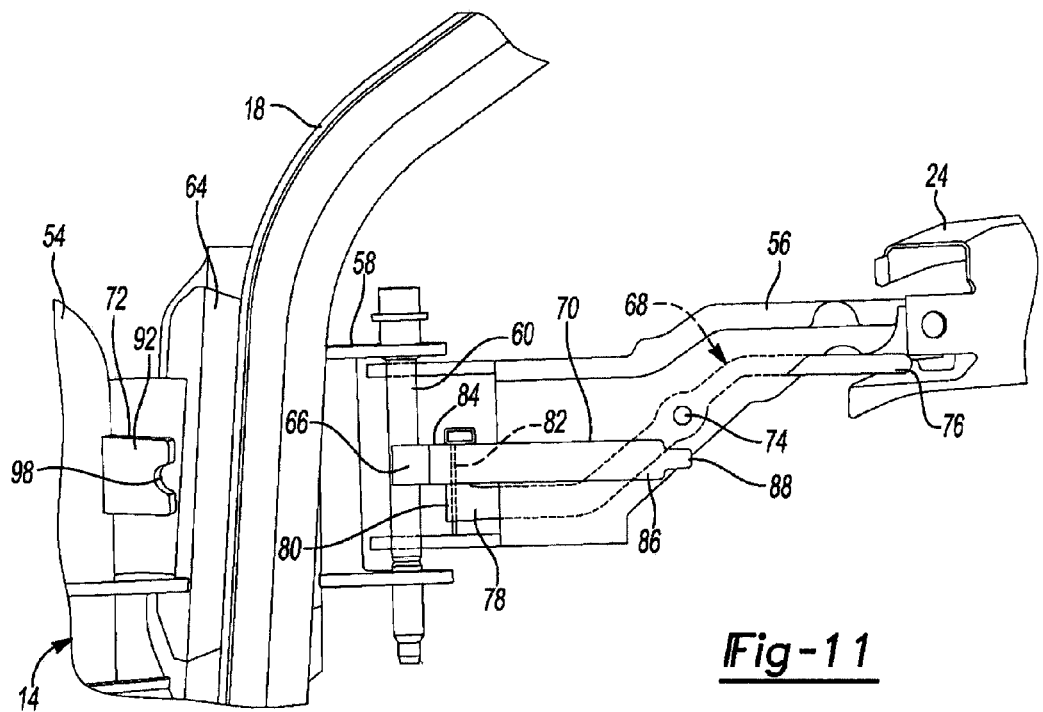
FIG. 11 is a partial perspective view of the guide mechanism and the sequencing mechanism while the door is in the closed position.

Referring now to FIGS. 4-7 and 11-15, the sequencing mechanism 42 may include a third member 68, a fourth member 70, and a fifth member 72. The third member 68 may be mounted to the first member 56 of the guide mechanism 40 and may be rotatable relative thereto about a pivot 74 (FIG. 11). The third member 68 may include a first end 76 and a second end 78. The first end 76 may slidably engage the exterior body track 24 and the ramp 34 disposed at the distal end 32 of the exterior body track 24, as shown in FIG. 16. The second end 78 may include a sleeve 80 that slidably engages a pin 82 mounted to the first member 56 (FIG. 11).

As shown in FIG. 11, the fourth member 70 may include a first end 84 and a second end 86. The pin 82 may extend through the first end 84 to allow the fourth member 70 to rotate relative to the third member 68 and the first member 56. The second end 86 may include a tab 88.

As shown in FIGS. 12-15, the fifth member 72 may include a body portion 90, a first end portion 92, and a second end portion 94. The first end portion 92 may extend perpendicularly from a first end 95 of the body portion 90 toward an interior of the vehicle 10. The second end portion 94 may extend from a second end 97 of the body portion 90 toward an exterior of the vehicle 10. The body portion 90 may be mounted to the second member 58 and may be rotatable relative thereto about a pivot 96. The first end portion 92 may include a notch 98 adapted to selectively receive the tab 88 of the fourth member 70 (see FIGS. 12-14). The second end portion 94 may include a tab 100 that selectively engages an aperture 102 formed in the door track 50 (compare FIGS. 14 and 15). When the tab 100 engages the aperture 102 (FIG. 14), the door track 50 may be locked relative to the sleeve 62. When the tab 100 is disengaged from the aperture 102 (FIG. 15), the door track 50 may be movable relative to the sleeve 62.

Figure 10:
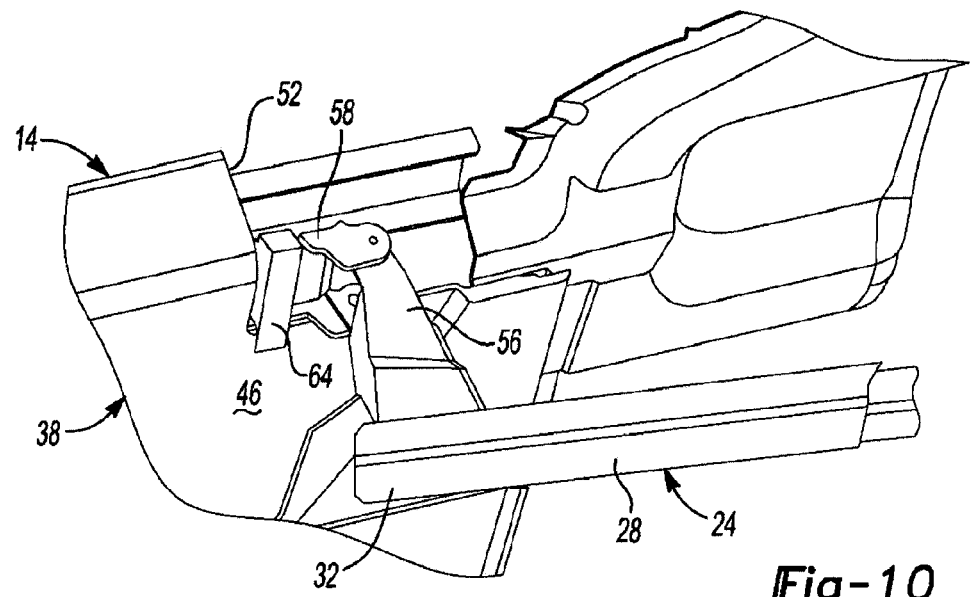
FIG. 10 is a partial perspective view of the interior side of the door in the fully open position according to the principles of the present disclosure.

With continued reference to FIGS. 1-16 operation of the door 14 will be described in detail. As described above, the door 14 is moveable relative to the doorway 16 among the closed position (FIGS. 1 and 4), the intermediate position (FIGS. 2 and 5), and the fully open position (FIGS. 3 and 6). As will be subsequently described, when the door 14 is in the closed position or between the closed position and the intermediate position, the sequencing mechanism 42 locks the second member 58 relative to the door track 50, thereby preventing relative movement between the door track 50 and the sleeve 62. Once the first member 56 of the guide mechanism 40 reaches the distal end 32 of the exterior body track 24 (e.g., when the door 14 is in the intermediate position), the sequencing mechanism 42 may restrict relative motion between the guide mechanism 40 and the exterior body track 24 and allow relative movement between the door track 50 and the sleeve 62. In this configuration the body shell 38 of the door 14 may move relative to the exterior body track 24 and the guide mechanism 40 to the fully open position (FIGS. 3, 6, and 10).

Figure 12:
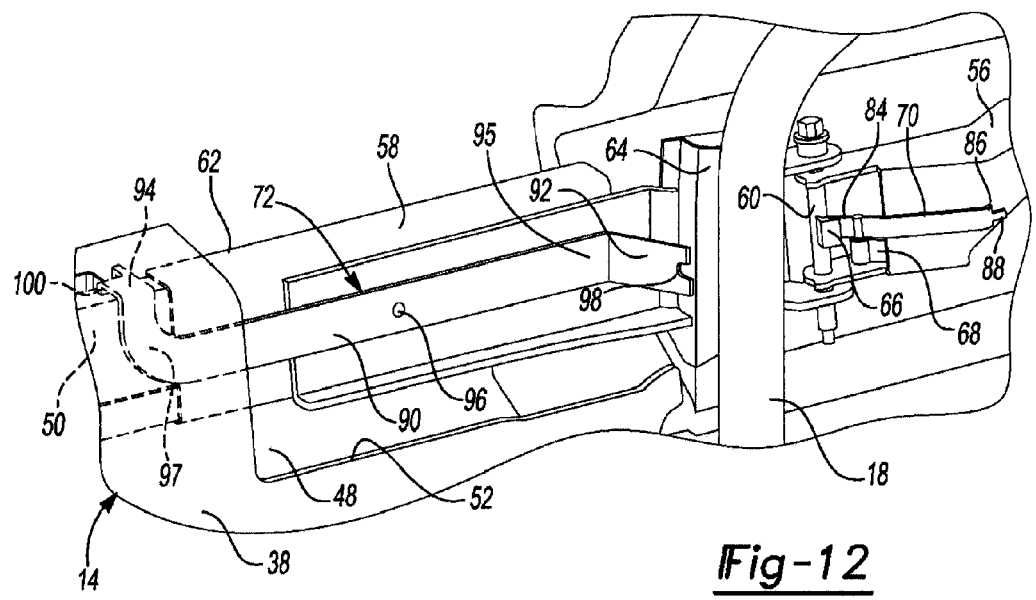
FIG. 12 is another partial perspective view of the guide mechanism and the sequencing mechanism while the door is in the closed position.

When the door 14 is in the closed position (FIGS. 1, 4, 8, 11, and 12), the first member 56 of the guide mechanism 40 may engage the first portion 26 of the exterior body track 24. In the closed position, the fourth member 70 of the sequencing mechanism 42 may be in a position such that the tab 88 is spaced apart from the notch 98 in the fifth member 72, as shown in FIGS. 4 and 12. This allows the seal member 64 attached to the second member 58 to sealingly engage the seal member 18 that surrounds the doorway 16 when the door 14 is in the closed position. It will be appreciated that weather stripping extending around a perimeter of the body shell 38 of the door 14 may also engage the seal member 18 so that the weather stripping and the seal members 18, 64 cooperate to seal a seam between the door 14 and the doorway 16 when the door is in the closed position.

Figure 13:
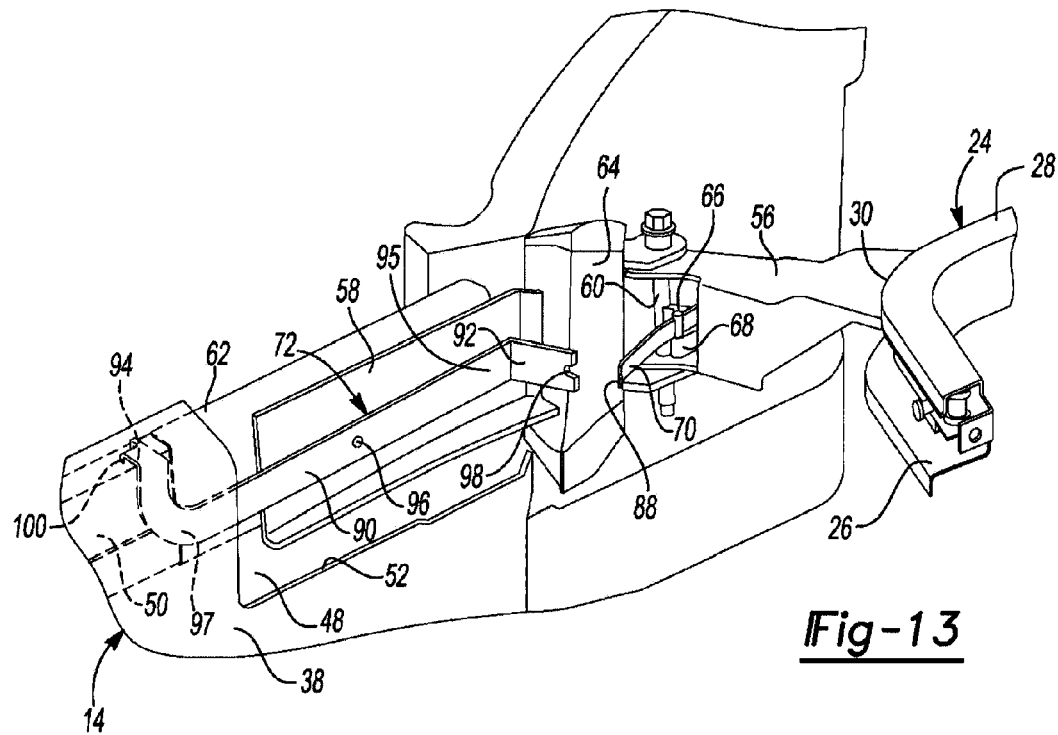
FIG. 13 is a partial perspective view of the guide mechanism and the sequencing mechanism while the door is between the closed and intermediate positions.
Figure 14:
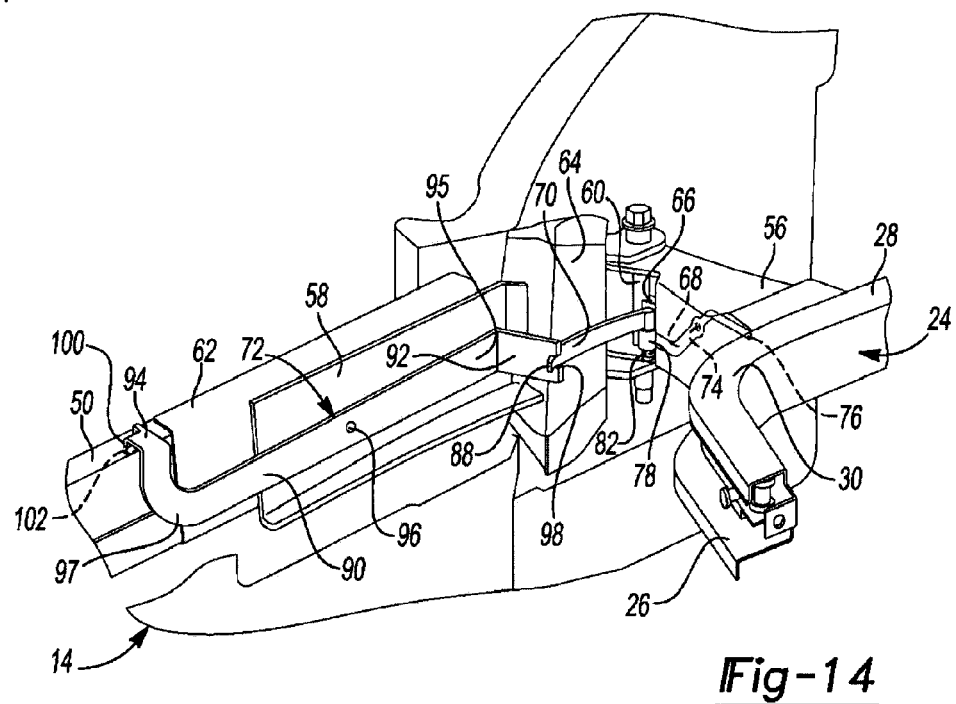
FIG. 14 is another partial perspective view of the guide mechanism and the sequencing mechanism while the door is between the closed and intermediate positions.

When the door 14 is moved from the closed position toward the intermediate position, the first member 56 of the guide mechanism 40 may slide across the first portion 26 and the elbow portion 30 of the exterior body track 24 toward the second portion 28. As the first member 56 rounds the elbow portion 30, the first member 56 may rotate about the hinge pin 60 relative to the second member 58 and the hinge pin 60, as shown in FIGS. 12-14. As the first member 56 rotates, the first end 84 of the fourth member 70 may come into contact with the cam 66 on the hinge pin 60 which may rotate the fourth member 70 relative to the first member 56 and the third member 68 to a position in which the tab 88 of the fourth member 70 engages the notch 98 in the fifth member 72 (compare FIGS. 12-14). As shown in FIG. 14, when the first member 56 is engaged with the second portion 28 of the exterior body track 24, the fourth member 70 extends laterally across the seal member 64 and extends between and operably interconnects the third member 68 and the fifth member 72.

From the position shown in FIG. 14, the door 14 may continue to move toward the intermediate position shown in FIGS. 2 and 5. That is, the first member 56 may slide across the second portion 28 of the exterior body track 24 toward the distal end 32. When the first member 56 reaches the distal end 32 (i.e., the intermediate position), the first end 76 of the third member 68 may slide along the ramp 34 formed in the exterior body track 24, thereby causing the third member 68 to rotate relative to the first member 56 about the pivot 74, as shown in FIG. 16. As the first end 76 of the third member 68 slides along the ramp 34 from a lower end 104 to an upper end 106, the third member 68 rotates about the pivot 74 such that the first end 76 moves upward and the second end 78 moves downward relative to the pin 82. As the second end 78 moves downward along the pin 82, the fourth member 70 likewise moves downward along the pin 82. Because the tab 88 of the fourth member 70 is engaged with the notch 98 in the fifth member 72, downward movement of the fourth member 70 causes the fifth member 72 to correspondingly rotate about the pivot 96 such that the first end portion 92 moves downward and the second end portion 94 moves upward, as shown in FIG. 15.

This upward movement of the second end portion 94 of the fifth member 72 causes the tab 100 to disengage the aperture 102 in the door track 50, as shown in FIG. 15. With the tab 100 disengaged from the aperture 102, the door track 50 may be free to move relative to the sleeve 62 and the guide mechanism 40 from the intermediate position (FIGS. 2, 5, and 9) to the fully open position (FIGS. 3, 6, and 10).

While the door 14 is between the intermediate and fully open positions or at the fully open position, the tab 100 of the fifth member 72 will not be aligned with the aperture 102 in the door track 50. This causes the fifth member 72 to remain in the position shown in FIG. 15 (i.e., with the second end portion 94 raised up relative to the door track 50), which in turn causes the fourth member 70 and the second end 78 of the third member 68 to remain in the downward positions relative to the pin 82 and causes the first end 76 of the third member

68 to remain in the position shown in FIG. 16 relative to the block 36. Therefore, as long as the door 14 is between the intermediate and fully open positions or at the fully open position, an upwardly extending projection 77 of the first end 76 will interfere with the block 36 to prevent movement of the third member 68 (and thus the first member 56 of the guide mechanism 40) relative to the exterior body track 24.

To close the door 14, the door 14 may be moved from the fully open position back to the intermediate position, i.e., the door track 50 may be moved relative to the sleeve 62 back to the intermediate position such that the aperture 102 in the door track 50 may be aligned with the tab 100 of the fifth member 72. Once the tab 100 and aperture 102 are aligned, the fifth member 72 will be allowed to rotate back to the position shown in FIG. 14, whereby the tab 100 is engaged with the aperture 102 to lock the door track 50 relative to the sleeve 62. Rotation of the fifth member 72 in this manner allows corresponding upward movement of the fourth member 70 and the second end 78 of the third member 68 and allows the first end 76 of the third member 68 to slide down the ramp 34 to the lower end 104. With the first end 76 of the third member 68 at the lower end 104 of the ramp 34, the third member (and thus the first member 56 of the guide mechanism 40) to move along the second portion 28 of the exterior body track 24 toward the elbow portion 30. As the first member 56 slides around the elbow portion 30, the first member 56 and the fourth member 70 may rotate relative to the second and fifth members 58, 72 back toward the positions shown in FIGS. 11 and 12. This causes the fourth member 70 to be spaced apart from the seal member 64 so that the seal member 64 may sealingly engage the seal member 18 surrounding the doorway 16.

It should be appreciated that the door 14 could be a manually actuated door or a motor-operated door that can be opened and closed by a control interface inside of the vehicle 10 or on a key fob, for example.

What is claimed is:

1. A system for moving of a door of a vehicle comprising:
    a door track mounted to the door;
    a guide mechanism connecting the door to a vehicle body for relative motion therebetween, the guide mechanism including a first member connected to the door track and a second member pivotably connected to the first member for rotation relative to the door track, the first member being movable relative to the door track and the door, the second member engaging a body track formed in the vehicle body and being movable relative thereto between a first end of the body track and a second end of the body track; and
    a sequencing mechanism including first and second links, the first link being movable between a locked position restricting movement of the first member relative to the door track and an unlocked position allowing movement of the first member relative to the door track, the second link being movable between a locked position restricting movement of the second member relative to the body track and an unlocked position allowing movement of the second member relative to the body track, the first and second links being configured to be operably connected with each other such that movement of the second link into the locked position causes corresponding movement of the first link into the unlocked position,
    wherein the sequencing mechanism includes a third link movable between a connected position in which the third link operably interconnects the first and second links and a disconnected position in which the first and second links are operably disconnected from each other.

2. The system of claim 1, wherein movement of the first link into the locked position causes corresponding movement of the second link into the unlocked position.

3. The system of claim 1, wherein the second link moves to the locked position upon movement of the second member to the second end of the body track, thereby moving the first link to the unlocked position and allowing movement of the door track and the door relative to the first member.

4. The system of claim 1, wherein the first and second links are operably connected with each other when the second member is between the first and second ends of the body track and are disconnected from each other when the second member is at the first end of the body track.

5. The system of claim 1, wherein the first member includes a seal member that sealingly engages the vehicle body to substantially seal the door to a doorway in the vehicle body.

6. The system of claim 1, wherein the third link is in the disconnected position when the second member of the guide mechanism is at the first end of the body track.

7. The system of claim 6, wherein rotation of the second member relative to the first member causes the third link to move into the connected position.

8. The system of claim 7, wherein the first member includes a seal member that sealingly engages the vehicle body to substantially seal the door to a doorway in the vehicle body, and wherein the third link is disposed entirely on a first side of the seal member when the second member is at the first end of the body track and extends laterally across the seal member in the connected position.

9. The system of claim 5, wherein the seal member sealingly engages a body seal member that at least partially surrounds the doorway in the vehicle body.

10. The system of claim 1, wherein the first member and the first link are at least partially concealed by a movable cover when the second member is at the first end of the body track.

11. The system of claim 1, wherein the vehicle body includes an upper track and a lower track, and the door includes an upper track guide movably engaging the upper track and a lower track guide movably engaging the lower track, and wherein the body track is disposed between the upper and lower tracks.

12. A vehicle comprising:
    a vehicle body defining a doorway;
    a door including a door track and movable relative to the doorway among a closed position, an intermediate position, and a fully open position;
    a guide mechanism connecting the door to a vehicle body for relative motion therebetween, the guide mechanism including a first member connected to the door track and a second member pivotably connected to the first member for rotation relative to the door track, the first member being movable relative to the door track and the door, the second member engaging a body track formed in the vehicle body and being movable relative thereto between a first end of the body track and a second end of the body track;
    a sequencing mechanism including a third member locking the first member relative to the door track when the door is between the intermediate position and the closed position and a fourth member locking the second member relative to the body track when the door is between the intermediate position and the fully open position; and
    a seal member disposed on the first member and sealingly engaging the vehicle body to substantially seal the door to the doorway when the door is in the closed position,
    wherein the sequencing mechanism includes a fifth member movable between a connected position in which the fifth member operably interconnects the third and fourth members and a disconnected position in which the third and fourth members are operably disconnected from each other.

13. The vehicle of claim 12, wherein the fifth member is in the disconnected position when the door is in the closed position.

14. The vehicle of claim 13, wherein rotation of the second member relative to the first member causes the fifth member to move into the connected position.

15. The vehicle of claim 13, wherein the seal member sealingly engages a body seal member when the door is in the closed position, the body seal member is mounted to the vehicle body and at least partially surrounds the doorway in the vehicle body.

16. The vehicle of claim 15, wherein the fifth member is disposed entirely on a first side of the second seal member when the door is in the closed position and extends laterally across the body seal member in the connected position.

17. The vehicle of claim 16, wherein the fifth member is in the connected position when the door is in one of the intermediate position and the fully open position.

18. The vehicle of claim 12, wherein the vehicle body includes an upper track and a lower track, and the door includes an upper track guide movably engaging the upper track and a lower track guide movably engaging the lower track, and wherein the body track is disposed between the upper and lower tracks.

* * * * *